(12) United States Patent
Lange et al.

(10) Patent No.: US 6,369,540 B1
(45) Date of Patent: Apr. 9, 2002

(54) BYPASS CIRCUIT FOR USE IN DC BRUSH MOTOR CONTROL

(75) Inventors: Christopher M. Lange, New Hope; Greg T. Mrozek, Brooklyn Park, both of MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/717,864

(22) Filed: Nov. 21, 2000

(51) Int. Cl.[7] ............................... H02P 3/18; H02P 7/74
(52) U.S. Cl. ................. 318/471; 318/430; 318/434; 318/608; 318/609
(58) Field of Search .............................. 318/254, 811, 318/472, 160–180, 430–480, 600–640; 363/41

(56) References Cited

U.S. PATENT DOCUMENTS

| | | | | |
|---|---|---|---|---|
| 3,619,752 A | * | 11/1971 | Bateika | 318/245 |
| 3,931,557 A | * | 1/1976 | Osburn | 318/434 |
| 3,974,427 A | * | 8/1976 | Carson | 236/1 C |
| 4,099,704 A | * | 7/1978 | Okumura et al. | 251/129.12 |
| 4,482,847 A | * | 11/1984 | Rudich et al. | 310/68 B |
| 4,584,511 A | * | 4/1986 | Rudich et al. | 318/12 |
| 4,604,558 A | * | 8/1986 | Hirsch | 318/128 |
| 4,605,983 A | * | 8/1986 | Harvey | 123/490 |
| 4,613,798 A | * | 9/1986 | Baumann | 251/129.11 |
| 4,623,826 A | * | 11/1986 | Benjamin et al. | 318/138 |
| 4,677,355 A | * | 6/1987 | Baumann | 251/129.11 |
| 4,799,003 A | * | 1/1989 | Tu et al. | 290/1 E |
| 5,045,735 A | * | 9/1991 | Christiaens | 310/36 |
| 5,409,194 A | * | 4/1995 | Blanc et al. | 251/129.11 |
| 5,838,553 A | * | 11/1998 | Heeringa | 320/140 |
| 6,249,100 B1 | * | 6/2001 | Lange | 318/471 |
| 2001/0010458 A1 | * | 8/2001 | Ohshima | 323/282 |

FOREIGN PATENT DOCUMENTS

EP 0-895-346 A2 * 7/1998

* cited by examiner

Primary Examiner—Paul Ip

(57) ABSTRACT

A circuit to bypass the Zener diodes in the flyback circuit of a DC brush motor actuator which uses a voltage sensitive device to detect when the power to the motor is de-activated to control a switch that short circuits the Zener diodes.

16 Claims, 1 Drawing Sheet

BYPASS CIRCUIT FOR USE IN DC BRUSH MOTOR CONTROL

BACKGROUND OF THE INVENTION

1. Field of the Invention

The present invention relates to a circuit for bypassing the Zener diodes connected across a DC brush motor to control the speed of the motor when the motor moves in reverse under the force of a bias device such as a spring.

2. Description of Co-pending Applications

In a co-pending patent application of Christopher M. Lange entitled "Drive Circuit and Method for an Electric Actuator with Spring Return" Ser. No. 08/904,005, filed Jul. 13, 1997, now Pat. No. 6,249,100 and assigned to the assignee of the present invention, an actuator system is shown in which an output shaft is positioned by a spring in a first position and upon command, is driven through a gear train to a second position by an electric motor. The circuit includes an input circuit for providing a current large enough to rotate the shaft against the force of the spring. A rotation sensor produces a signal when the motor and shaft are stalled at the second position and a modulation circuit receiving the signal from the rotation sensor operates to reduce the current to the motor so as to hold the stalled shaft and motor at the second position with a minimum of energy usage. When the current to the motor is removed, the spring forces the motor in reverse and the shaft returns to the first position. A Zener diode and a conventional diode are connected in series, between the power terminals of the motor to provide a current circulation path which regulates the voltage induced across the windings of the motor and enhances the braking effect provided by the motor in its unenergized state when it is rotating in reverse under the force of the bias. Unfortunately, during powered operation, when the motor is driving the shaft toward the second position, the current passes through the Zener diode causing extra power consumption and reducing the efficiency rate.

In a co-pending application of Christopher M. Lange and Greg T. Mrozek entitled "Circuit using Current Limiting to Reduce Power Consumption of Actuator with DC Brush Motor" Ser. No. 09/717,564, Filed Nov. 21, 2000, and assigned to the assignee of the present invention, an improvement to the circuit of the above mentioned application Ser. No. 08/904,005 is described and claimed. In the improved circuit, a Zener diode bypass circuit is briefly described which comprised the subject matter of the present invention.

BRIEF DESCRIPTION OF THE INVENTION

The present invention overcomes the problem of wasted energy passing through the Zener diode(s) during forward operation by providing a bypass circuit that is activated to bypass the Zener diode(s) during forward operation.

DETAILED DESCRIPTION OF THE PREFERRED EMBODIMENTS

Figure 1:
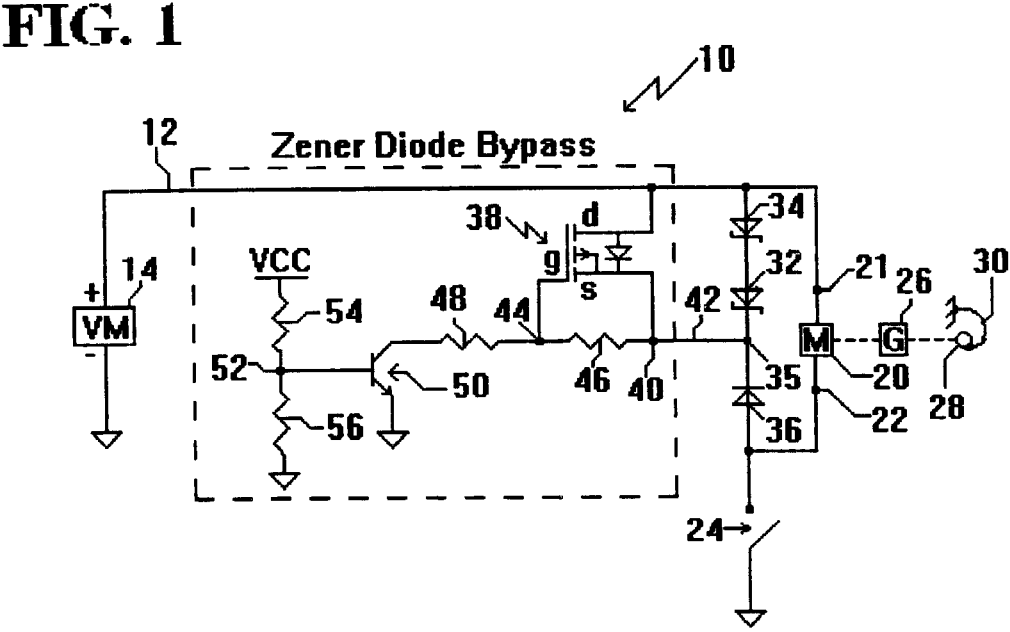
FIG. 1 is a schematic diagram of the preferred embodiment of the present invention.

In FIG. 1, the circuit labeled "Zener Diode Bypass," 10, is shown connected by a line, 12 to a source of DC voltage, 14, identified as VM. A motor 20, is shown, having a first input terminal, 21, connected to line, 12, and a second input terminal, 22, connected through a switch, 24, to signal ground. Motor, 20, operates through a gear train, 26, to drive a shaft, 28, against the bias of a spring, 30, from a first, or rest position, to a second, or stalled position. For example, shaft, 28, may be connected to the damper valve of a heating or cooling system (not shown) where the first, or rest position, is fully closed and the second, or stalled position, is fully open. The speed of motor, 20, while it is driving from the first position to the second position, is controlled by switch, 24, which may be a FET which opens and closes very rapidly in a manner described and claimed in the above mentioned co-pending application Ser. No. 08/904,005. At the stalled position, the motor, 20, has enough power to hold the valve at the fully open position. When the motor, 20, is turned off, as by removal of the voltage VM, the spring, 30, will rotate shaft, 28, in the opposite direction driving motor, 20, in reverse, back to the closed position.

Connected across motor 20, from junction point 21 to junction point 22, are two series connected Zener diodes, 32 and 34, connected, at a junction point 35, to a conventional diode, 36, in cathode-to-cathode relationship. While two Zener diodes, 32 and 34, have been shown, the number may vary depending on power dissipation needed.

Since the speed of return is proportional to the voltage across Zener diodes, 32 and 34, their value determines the spring return speed of the actuator, and, accordingly, a major purpose of Zener diodes, 32 and 34, is to regulate the voltage induced across the windings of motor, 20, to control the speed of return of motor, 20, to the first position and to enhance the braking effect provided by motor, 20, when power is removed. However, because they are in the "flyback" current path, Zener diodes, 32 and 34, waste energy during the forward drive mode of the actuator. Accordingly, it is desirable to bypass Zener diodes, 32 and 34, when the motor 20 is driving forward to the second position.

This has been accomplished in a previously sold damper circuit, (identified by Honeywell as the ML8105 Fast Acting Two Position Actuator), using a current controlled bypass transistor connected across the Zener diodes which is actuated to an "on" condition, to short circuit the Zener diodes, when current flows between the emitter and collector of the transistor. Since current flow from emitter to collector occurs when the transistor is "on" and when flyback current is flowing through the motor (i.e., when VM is applied and when the rapid acting switch, or FET, is open), the Zener diodes are short circuited, as desired, when the motor is forward driving. Unfortunately, when the rapid acting switch, or FET, is closed, as happens very rapidly to control the motor current, the transistor turns "off" and the Zener diodes are not short circuited. When the rapid acting switch, or FET, opens again, the transistor is "off" and is forced to turn back "on" to allow the motor flyback current to pass through it from emitter to collector. Even though this transistor turns back "on" very rapidly, significant undesirable energy is dissipated because the motor flyback current must pass through the Zener diodes during the short period of time while the transistor is turning back "on." The present invention overcomes this problem by using a Zener Diode Bypass circuit in which the bypass transistor is voltage controlled, as will be described.

Connected across Zener diodes, 32 and 34, is a P channel FET, 38, having its source electrode connected to a junction point, 40, which is connected by a line, 42, to junction point, 35, its drain electrode connected to voltage source VM at line, 12, and its gate electrode connected to a junction point, 44. A resistor, 46, is connected between the source electrode, at junction point 40, and the gate electrode at a junction point, 44. Junction point 44 is also connected through a resistor, 48, to the collector of an NPN transistor, 50, the emitter of which is connected to signal ground. The base of transistor, 50, is connected to a junction point, 52, between a pair of resistors, 54 and 56, connected in series between a regulated DC voltage source, VCC, and signal ground. VCC is derived from a voltage regulator circuit described in the above-mentioned co-pending application Ser. No. 09/717, 564, field Nov. 21, 2000, and turns "off" and "on" with VM.

In operation, whenever the system is driving the shaft, 28, toward the stall point and during the time the shaft is at the stall point, the power, VM, and VCC are "on." Resistor, 54, and resistor, 56, are chosen to produce a sufficient bias voltage at the base of transistor, 50, which turns it "on" creating a path from the source electrode of the FET 38 to signal ground through resistors, 46 and 48. This provides a gate signal to FET, 38, which turns it "on" and Zener diodes 32 and 34 are short-circuited with only the conventional diode 36 in the flyback current path. Since FET, 38, is not current controlled, it does not turn "off" when switch 24 is closed. It only turns "off" when VCC falls below a predetermined value. This occurs when VM, and thus VCC, are "off" and the system is de-energized and when spring, 30, pulls shaft, 28, and motor, 20, in reverse, the voltage at junction point, 52, disappears and transistor 50 turns "off". The gate of FET, 38, is no longer biased "on" thus, turning FET switch, 38, "off." In the "off" condition, Zener diodes 32 and 34 are no longer short circuited and they may now operate to control the voltage induced in motor, 20, and enhance the braking effect as they are designed to do.

It is therefore seen that we have provided a circuit for bypassing the voltage controlling devices in a flyback circuit of a DC brush motor. This is accomplished without unnecessary power dissipation in the bypass circuit. Many changes and modifications to the preferred embodiment describe will occur to those having ordinary skill in the art. For example, the number of diodes may be changed to provide the desired operation and various drive means and bias devices may be used in place of gears 26 and spring 30. If VM is a regulated voltage source, it may replace VCC and, in some cases, it may be possible to use an unregulated source for VCC provided junction point, 50, is of sufficient voltage to turn transistor, 50, "on." We therefore do not wish to be limited to the specific structures used in connection with the description of the preferred embodiment.

What is claimed is:

1. Apparatus for use with a motor which is energized by a voltage source to drive in a first direction and which returns in an opposite direction under the force of a bias when the voltage source is removed, the motor having a voltage control device in the flyback path to limit the voltage induced during the return, comprising:

a voltage controlled switch connected across the voltage control device to short circuit the voltage control device when activated; and a sensor connected to activate the voltage-controlled switch when the motor is energized to drive in the first direction.

2. Apparatus according to claim 1 wherein the voltage controlled switch is an FET that turns "conducting" to short circuit the voltage control device when the voltage source is "on" and which turns "non-conducting" to allow the voltage control device to control the voltage when the voltage source is "off".

3. Apparatus according to claim 2 wherein the sensor includes a transistor connected to the voltage source and operable to turn the FET "conducting" and "non-conducting" as the voltage source turns "on" and "off".

4. Apparatus according to claim 3 wherein the gate of the FET is connected to the transistor to cause the FET to be conducting when the transistor is "on."

5. Apparatus according to claim 4 wherein the FET has source and drain electrodes connected across the voltage control device so that, when conducting, the FET short circuits the voltage control device.

6. Apparatus according to claim 1 wherein the voltage control device includes a Zener diode.

7. Apparatus according to claim 5 wherein the voltage control device includes a Zener diode.

8. Apparatus for use with a member which is driven from a first position to a second position by a motor against the force of a bias which bias is used to return the motor to the first position when the motor is de-energized, wherein a voltage control device is used in the flyback path of the motor to limit the voltage induced during the return, comprising:

a voltage controlled switch connected across the voltage control device to short circuit the voltage control device when energized; and a voltage sensitive device connected to the switch and operable when the motor is energized to energize the switch.

9. Apparatus according to claim 8 including a voltage source to energize the motor, and wherein the voltage controlled switch includes an FET which turns "conducting" to short circuit the voltage control device when the voltage source is energized.

10. Apparatus according to claim 9 wherein the voltage-sensitive device includes a transistor connected to the voltage source and operable when the voltage source is energized to turn the FET to a "conducting" state and operable when the voltage source is de-energized to turn the FET to a "non-conducting" state.

11. Apparatus according to claim 10 wherein the gate of the FET is connected to the transistor to cause the FET to be "conducting" when the transistor is "on" and "non-conducting" when the transistor is "off."

12. Apparatus according to claim 11 wherein the FET has source and drain electrodes connected across the voltage control device so that, when "non-conducting" the voltage control device is in the flyback path and, when "conducting", the FET short circuits the voltage control device.

13. The method of minimizing excess power consumption, when a motor is energized by a source of voltage to move in a first direction, caused by a voltage limiting device that is needed to limit the voltage generated when the motor is moved in a reverse direction by a bias comprising the steps of:

A. placing a voltage controlled switch across the voltage limiting device to short circuit the voltage limiting device whenever the switch is activated; and B. de-activating the switch whenever the source of voltage is removed allowing the motor to move in the reverse direction.

14. The method of claim 13 wherein the activating step B includes:

B1. sensing the voltage energizing the motor; and

B2. de-activating the switch whenever the sensed voltage falls below a predetermined value.

15. The method of claim 14 wherein the sensing step B1 includes:

B1a. connecting the base of a transistor to the source of the voltage so that the transistor turns "on" only when the sensed voltage is above the predetermined value.

16. The method of claim 15 wherein step B2 farther includes:

B2a. connecting the gate of an FET to the transistor so that it becomes "conducting" only when the transistor is "on"; and B2b. connecting the source and drain electrodes of the FET across the voltage control device so that the FET shorts circuits the voltage control device when it conducts.

* * * * *